United States Patent
Singh

(10) Patent No.: US 12,342,181 B1
(45) Date of Patent: Jun. 24, 2025

(54) METHODS TO UTILIZE UNLICENSED SPECTRUM FOR DIRECT TO DEVICE COMMUNICATION FOR MOBILE SATELLITE SERVICE

(71) Applicant: Telcom Ventures, LLC, Miami, FL (US)

(72) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 0 days.

(21) Appl. No.: 19/055,946

(22) Filed: Feb. 18, 2025

Related U.S. Application Data

(60) Provisional application No. 63/725,756, filed on Nov. 27, 2024.

(51) Int. Cl.
  *H04W 16/14* (2009.01)
  *H04W 16/18* (2009.01)
  *H04W 84/06* (2009.01)

(52) U.S. Cl.
  CPC ......... *H04W 16/18* (2013.01); *H04W 16/14* (2013.01); *H04W 84/06* (2013.01)

(58) Field of Classification Search
  CPC ...... H04W 16/18; H04W 16/14; H04W 84/06
  See application file for complete search history.

(56) References Cited

U.S. PATENT DOCUMENTS

| 6,023,463 | A | * | 2/2000 | Wiedeman | H04B 7/18513 370/344 |
| 6,058,307 | A | * | 5/2000 | Garner | H04B 7/18567 455/12.1 |
| 6,185,409 | B1 | * | 2/2001 | Threadgill | H04B 7/18506 455/12.1 |
| 6,272,341 | B1 | * | 8/2001 | Threadgill | H04B 7/18539 455/428 |
| 2003/0219002 | A1 | * | 11/2003 | Kishida | H04W 16/16 370/466 |
| 2007/0060045 | A1 | * | 3/2007 | Prautzsch | H04H 20/59 455/3.06 |
| 2007/0149127 | A1 | * | 6/2007 | Karabinis | H04B 7/18563 455/12.1 |
| 2017/0245185 | A1 | * | 8/2017 | Chuberre | H04W 36/04 |
| 2020/0106532 | A1 | * | 4/2020 | Leather | H04B 17/20 |
| 2020/0328776 | A1 | * | 10/2020 | Scholand | H04B 1/715 |
| 2021/0099329 | A1 | * | 4/2021 | Hellfajer | H04L 27/2657 |
| 2021/0367663 | A1 | * | 11/2021 | Ravishankar | H04W 28/0268 |
| 2024/0284339 | A1 | * | 8/2024 | Sayenko | H04W 72/21 |

\* cited by examiner

*Primary Examiner* — Michael J Moore, Jr.
*Assistant Examiner* — Prenell P Jones
(74) *Attorney, Agent, or Firm* — Myers Bigel, P.A.

(57) ABSTRACT

Disclosed are methods for allocating spectrum by a Mobile Satellite Service (MSS) satellite to a User Equipment (UE). The method includes monitoring, by the MSS satellite, radio spectrum in a coverage area of the MSS satellite, determining a spectrum usage map of the radio spectrum in the coverage area, where the spectrum usage map comprises frequency bands comprising licensed frequency bands and unlicensed frequency bands, and transmitting the spectrum usage map for use by the UE. Related wireless electronic devices are also discussed.

31 Claims, 9 Drawing Sheets

ESTABLISHING, BY THE UE, A SESSION WITH THE MSS SATELLITE ON A DESIGNATED FREQUENCY BAND BASED ON THE SPECTRUM USAGE MAP. ⟋1210

FIG. 12

RECEIVING, BY THE UE FROM THE MSS SATELLITE, AN ORDER FOR THE UE SWITCHING TO A DIFFERENT FREQUENCY BAND ⟋1310

FIG. 13

RECEIVING, BY THE UE, A SECOND SPECTRUM USAGE MAP FROM A SECOND MSS PROVIDER, THE SECOND SPECTRUM USAGE MAP COMPRISING ONE OR MORE SECOND LICENSED FREQUENCY BANDS AND ONE OR MORE SECOND UNLICENSED FREQUENCY BANDS AVAILABLE FOR USE BY THE UE ⟋1410

SELECTING, BY THE UE, A SUITABLE SPECTRUM USAGE MAP COMPRISING EITHER THE FIRST SPECTRUM USAGE MAP FROM THE FIRST MSS PROVIDER OR THE SECOND SPECTRUM USAGE MAP FROM THE SECOND MSS PROVIDER, BASED ON CHARACTERISTICS OF THE FIRST SPECTRUM USAGE MAP AND THE SECOND SPECTRUM USAGE MAP ⟋1420

FIG. 14

( ESTABLISHING THE COMMUNICATION LINK )⟋930

ESTABLISHING, BY THE UE, A COMMUNICATION LINK WITH EITHER A FIRST MSS SATELLITE OF THE FIRST MSS PROVIDER OR A SECOND MSS SATELLITE OF THE SECOND MSS PROVIDER, BASED ON THE SUITABLE SPECTRUM USAGE MAP ⟋1510

FIG. 15

METHODS TO UTILIZE UNLICENSED SPECTRUM FOR DIRECT TO DEVICE COMMUNICATION FOR MOBILE SATELLITE SERVICE

CROSS-REFERENCE TO RELATED APPLICATION

The present application claims the benefit of U.S. Provisional Patent Application No. 63/725,756, filed Nov. 27, 2024, the disclosure of which is herein incorporated in its entirety by reference.

BACKGROUND

Various embodiments described herein relate to methods, devices, and computer program products for communication networks, and more particularly to wireless communication networks that include satellite communication.

Opportunistic use of spectrum using licensed and unlicensed spectrum is a common practice. Terrestrial mobile service coverage may extend around population centers. Vast areas of the globe are not covered by cellular mobile networks. There is a significant interest in UEs that connect to Mobile Satellite Service (MSS) in these areas.

SUMMARY

Various embodiments of the present invention are directed to a method of allocating spectrum by a Mobile Satellite Service (MSS) satellite to a User Equipment (UE). The method includes monitoring, by the MSS satellite, radio spectrum in a coverage area of the MSS satellite, and determining a spectrum usage map of the radio spectrum in the coverage area, and transmitting the spectrum usage map for use by the UE. The spectrum usage map includes frequency bands including licensed frequency bands and unlicensed frequency bands.

According to some embodiments, the transmitting the spectrum usage map for use by the UE includes transmitting the spectrum usage map directly to the UE. According to some embodiments, the transmitting the spectrum usage map for use by the UE includes transmitting the spectrum usage map to a terrestrial Broadband Wireless Access (BWA) base station. The terrestrial BWA base station may transmit, to the UE, ones of the licensed frequency bands and ones of the unlicensed frequency bands available for use by the UE. According to some embodiments, the transmitting the spectrum usage map for use by the UE includes transmitting the spectrum usage map using an Out of Band Control Channel Network (OBCCN) to the UE.

According to some embodiments, the spectrum usage map may include preferred licensed frequency bands that are licensed to a MSS provider that operates the MSS satellite. The preferred licensed frequency bands may be based on an availability of the frequency bands, capability of the UE to use the frequency bands, relationship of the frequency bands with the MSS provider, and/or a geographical location of the UE. The spectrum usage map may further include third-party licensed frequency bands that are available for use by the MSS provider. The coverage area of the MSS satellite includes one or more satellite spot beams associated with respective terrestrial coverage areas in which the UE is configured to communicate with the MSS satellite.

According to some embodiments, monitoring by the MSS satellite of the radio spectrum in the coverage area of the MSS satellite includes requesting the UE to provide information associated with radio spectrum usage patterns in a vicinity of the UE, and receiving, from the UE, the information associated with radio spectrum usage patterns in the vicinity of the UE. Determining the spectrum usage map of the radio spectrum in the coverage area may include selecting the licensed frequency bands and the unlicensed frequency bands in the spectrum usage map based on the information associated with radio spectrum usage patterns in the vicinity of the UE that were received. Determining the spectrum usage map of the radio spectrum in the coverage area may include selecting the licensed frequency bands and the unlicensed frequency bands in the spectrum usage map based on an availability of the frequency bands, capability of the UE to use the frequency bands, relationship of the frequency bands with an MSS provider associated with the MSS satellite, and/or a geographical location of the UE.

Various embodiments of the present invention are directed to a method of communication by a User Equipment (UE) in a communication network served by a Mobile Satellite Service (MSS) satellite. The method includes receiving, by the UE, a spectrum usage map including one or more licensed frequency bands and one or more unlicensed frequency bands available for use by the UE, selecting a communication frequency band among the one or more licensed frequency bands and the one or more unlicensed frequency bands, and establishing, by the UE, a communication link with the MSS satellite using the communication frequency band that was selected.

According to some embodiments, receiving the spectrum usage map by the UE may include receiving the spectrum usage map directly from the MSS satellite. Receiving the spectrum usage map by the UE may include receiving the spectrum usage map indirectly from the MSS satellite via a terrestrial Broadband Wireless Access (BWA) base station. The UE may create a preferred list of frequency bands based on the spectrum usage map that was received. The preferred list of frequency bands may include an ordered list including the one or more licensed frequency bands and the one or more unlicensed frequency bands. The ordered list may indicate a preferred order for the UE to select the frequency band used for the establishing the communication link. The UE may be configured to download the spectrum usage map using a terrestrial network including an internet connection, a Mobile Network Operator (MNO) connection, a Fixed Satellite Service (FSS), or an unlicensed network.

According to some embodiments, the method may include establishing, by the UE, a session with the MSS satellite on a designated frequency band based on the spectrum usage map. the method may include receiving, by the UE from the MSS satellite, an order for the UE switching to a different frequency band. The switching by the UE may include switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands.

According to some embodiments, the spectrum usage map may include a first spectrum usage map from a first MSS provider. The one or more licensed frequency bands may include one or more first licensed frequency bands, and the one or more unlicensed frequency bands may include one or more first unlicensed frequency bands. The method may further include receiving, by the UE, a second spectrum usage map from a second MSS provider, the second spectrum usage map including one or more second licensed frequency bands and one or more second unlicensed frequency bands available for use by the UE, and selecting, by the UE, a suitable spectrum usage map including either the first spectrum usage map from the first MSS provider or the second spectrum usage map from the second MSS provider, based on characteristics of the first spectrum usage map and the second spectrum usage map. Establishing the communication link may include establishing, by the UE, the communication link with either a first MSS satellite of the first MSS provider or a second MSS satellite of the second MSS provider, based on the suitable spectrum usage map.

Various embodiments of the present invention are directed to a wireless electronic device associated with a Mobile Satellite Service (MSS) satellite, the wireless electronic device configured to allocate spectrum to a User Equipment (UE). The wireless electronic device may include a transceiver, a processor coupled to a memory, such that the memory is configured to store instructions that cause the processor to perform operations including monitoring, by the MSS satellite, radio spectrum in a coverage area of the MSS satellite, and determining a spectrum usage map of the radio spectrum in the coverage area, wherein the spectrum usage map includes frequency bands including licensed frequency bands and unlicensed frequency bands. The transceiver may be configured to transmit the spectrum usage map to the UE.

According to some embodiments, the coverage area of the MSS satellite includes one or more satellite spot beams associated with respective terrestrial coverage areas in which the UE is configured to communicate with the MSS satellite. Monitoring, by the MSS satellite, the radio spectrum in the coverage area of the MSS satellite may include requesting the UE to provide information associated with radio spectrum usage patterns in a vicinity of the UE, and receiving, from the UE, the information associated with radio spectrum usage patterns in the vicinity of the UE.

According to some embodiments, determining the spectrum usage map of the radio spectrum in the coverage area may include selecting the licensed frequency bands and the unlicensed frequency bands in the spectrum usage map based on the information associated with radio spectrum usage patterns in the vicinity of the UE that were received. Determining the spectrum usage map of the radio spectrum in the coverage area may further include selecting the licensed frequency bands and the unlicensed frequency bands in the spectrum usage map based on an availability of the frequency bands, capability of the UE to use the frequency bands, relationship of the frequency bands with an MSS provider associated with the MSS satellite, and/or a geographical location of the UE.

Various embodiments of the present invention are directed to a wireless electronic device associated with a User Equipment (UE) in a communication network served by a Mobile Satellite Service (MSS) satellite. The wireless electronic device includes a transceiver, and a processor coupled to a memory. The memory is configured to store instructions that cause the processor to perform operations including receiving, a spectrum usage map including one or more licensed frequency bands and one or more unlicensed frequency bands available for use by the UE, and selecting a communication frequency band among the one or more licensed frequency bands and the one or more unlicensed frequency bands, and establishing, using the transceiver, a communication link with the MSS satellite on the communication frequency band that was selected.

According to some embodiments, the UE may create a preferred list of frequency bands based on the spectrum usage map that was received. the preferred list of frequency bands may include an ordered list including the one or more licensed frequency bands and the one or more unlicensed frequency bands. The ordered list may indicate a preferred order for the UE to select the frequency band used for the establishing the communication link. The processor may be configured to perform operations further including receiving, from the MSS satellite, an order for the UE switching to a different frequency band. The UE switching may include switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands.

BRIEF DESCRIPTION OF THE DRAWINGS

FIGS. 2 to 15 are flowcharts illustrating operations for allocating spectrum of a MSS satellite to a UE, according to some embodiments of the present inventive concepts.

DETAILED DESCRIPTION

Figure 1A:
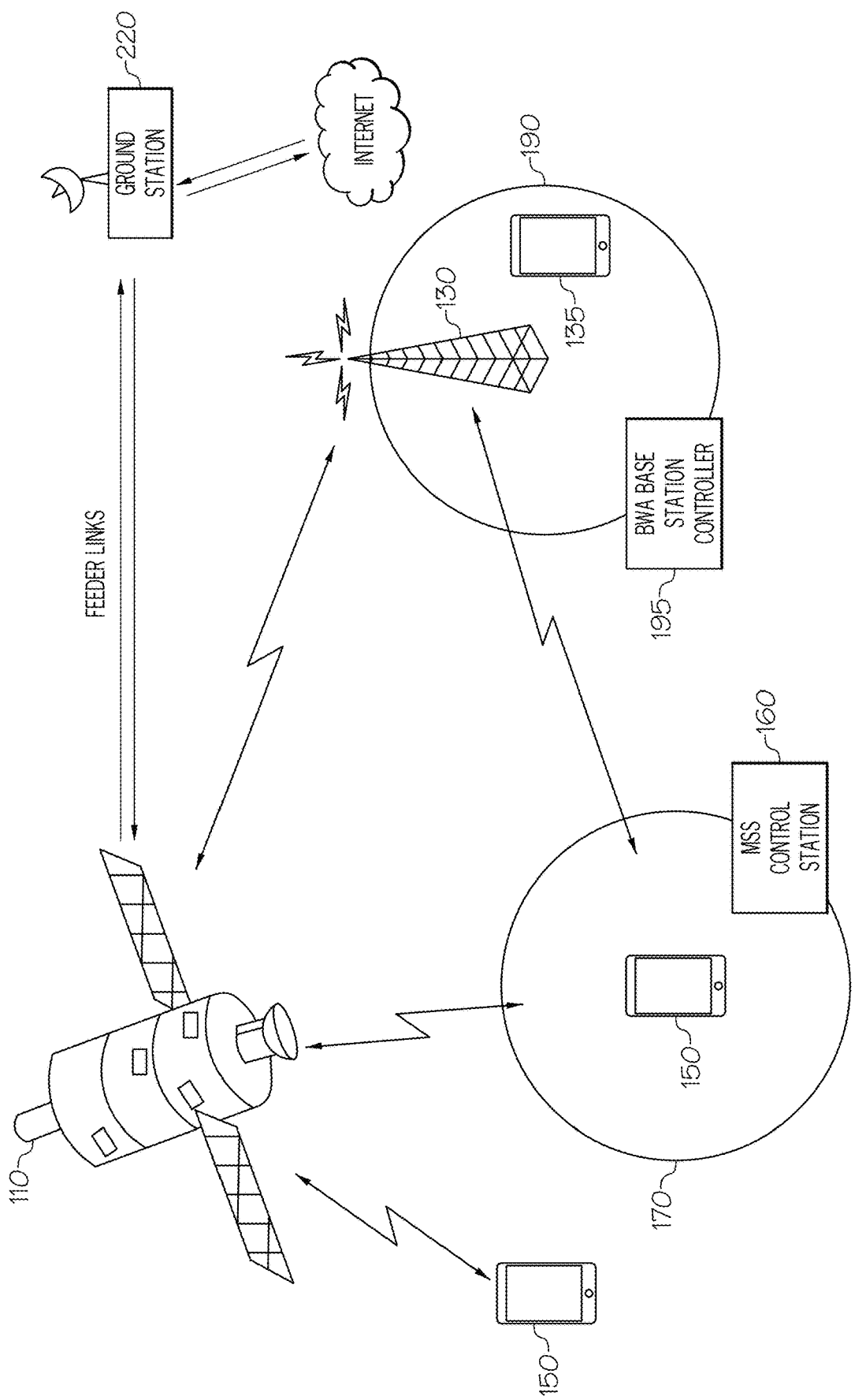
FIG. 1A is a diagram illustrating geographical areas with User Equipment (UEs) located therein, that are served by Mobile Satellite Service (MSS) satellites, according to some embodiments of the present inventive concepts.

Terrestrial mobile service coverage, such as cellular networks, may extend around population centers, but rural and less dense areas may not have adequate terrestrial mobile service. Vast areas of the globe are not covered by cellular mobile networks. There is a significant interest in providing mobile services to these uncovered areas using a standard user equipment (UE). Beyond UEs, this service, according to embodiments described herein, may also have other applications such as IoT, land transportation, and marine transportation.

Satellite radio spectrum may be shared with terrestrial Broadband Wireless Access (BWA) radio spectrum. Furthermore, satellite communications may use unlicensed spectrum for communication, in some circumstances. Spectrum may be used for Mobile Satellite Service (MSS) uplink (earth to space) and downlink (space to earth).

Licensed spectrum around the world is limited. However, there is significant allocation of unlicensed spectrum which may be used in conjunction with limited, licensed spectrum to provide Direct to Device (DtD) service for voice, data, messaging, video, and other services. Techniques described herein apply to any combination of different licensed and unlicensed bands, depending on network configuration.

Mobile Satellite Service (MSS) networks may have limitations because of the transmit/receive antenna arrays, power limitations, and the licensing rules for radio spectrum in different geographical areas. A vast majority of radio spectrum is underutilized across most of the globe, outside of population centers. Discussed herein are methods to enable efficient use of radio spectrum that is licensed, unlicensed, and/or licensed to third parties for use by a MSS network.

A MSS space network is capable of monitoring the utilization of radio spectrum in real time in its coverage area, including frequency bands in use and signal quality. The MSS space network may be capable of using portions of the licensed spectrum and other bands outside of the license spectrum which may be unlicensed radio spectrum bands or licensed to third parties, depending on the antennas and payload available on the satellite.

A satellite may be designed with a capability to monitor the bands of the radio spectrum to create a real time map of spectrum utilization. A spectrum utilization map may be downloaded to ground stations using feeder links, or may be downloaded to a UE on the licensed spectrum, on unlicensed spectrum, or on third-party licensed spectrum depending on the space network capability. Feeder links may be used for an MSS satellite to directly communicate with a ground station. Traffic links or control channels may be used by the MSS satellite to direct communicate with the UE or with a base station. The satellite may directly communicate with the UE through traffic links (i.e., uplinks and/or downlinks). In some embodiments, traffic links from the MSS satellite may directly facilitate communication with a terrestrially-located repeater, that is in communication with the UE. The terrestrially-located repeater may be a MSS control station. Thus the spectrum utilization map may be downloaded from the MSS satellite to the repeater, which provides it to the UE. The repeater may receive signals from the satellite, but be a standalone network element that does not include cellular base station functionality and may not have a backhaul link. Therefore, the repeater provides the functionality of receiving satellite signals and communicating these satellite signals to the UE, including configuration information, communication, spectrum utilization map downloading, and other UE functionality controlled by the MSS satellite provider. In some embodiments, the ground station is connected to the Internet, such that the UE can obtain the spectrum utilization map from the Internet.

A space segment of the network may monitor designated unlicensed spectrum bands and/or licensed spectrum bands all of the time and create a spectrum usage map (SUM). To monitor the spectrum on the downlink bands, the MSS satellite may use guard bands during which the MSS satellite is not transmitting and during which monitoring by the MSS satellite may occur. During the transmission on the active segment of radio spectrum, there may be blanking periods/intervals during which the transmissions are turned off to monitor the radio spectrum on the downlink. In some embodiments, periodic guard bands may be used such that transmitting and monitoring activities may not occur concurrently in frequency. Calculation of the spectrum usage map may be done by the MSS satellite 110 or may be done at the ground station 220 when related data is received by feeder links from the MSS satellite 110, or at the BWA base station 120. In some embodiments, calculation of the spectrum usage map may be done at a remote location when data is received through the Internet. The spectrum usage map may be shared with the UE or with terrestrial ground stations such as a base station, an MSS control station/repeater, and/or a base station controller. The spectrum usage map may be shared by using data transmission on the licensed spectrum or shared directly by the space network to download the spectrum usage map to the UE or with terrestrial ground stations. In some embodiments, the spectrum usage map may be communicated by space segment transmission on unlicensed bands, if permitted under local rules, or by pre-loading the spectrum map based on geographic areas where the UE is located. However, it is noted that certain remote geographic areas may have no licensed spectrum available for use. In such cases, the unlicensed spectrum may be used. The spectrum usage map may include information such as cost of service, grade of service, channels, power, and/or characteristics of the frequency bands.

Specifically, the space network may monitor radio spectrum in the satellite geographical coverage areas, also referred to as spot beams, to determine usage of the radio spectrum, types of usage of the radio spectrum, and usage characteristics such as signal strength, periodicity of such usage, and other parameters which may be relevant. This information may be downloaded to a ground station via feeder links, using licensed spectrum, unlicensed spectrum, or third-party licensed spectrum. A UE on the ground may access this spectrum usage map for a given geographical area, or the map of frequency bands available for use may be transmitted to a UE. In some embodiments, multiple maps from multiple satellite service providers may be downloaded to the UE such that the UE may make a decision of which frequency bands associated with a selected map and/or service provider to use.

An MSS provider, which owns, operates, or administers the MSS satellite system may designate preferred spectrum bands, spectrum bands licensed to the MSS provider, unlicensed spectrum, or third-party licensed spectrum bands for a given geographical area covered by the spot beam of the MSS satellite. In some embodiments, the MSS provider may designate a subset of the area covered within a spotbeam. The MSS network provider may make decisions regarding a more precise geographical area within a spot beam by sharing the usage information about the spectrum in the vicinity of the UE within the spotbeam. This more precise geographical area may be determined by requesting the UE to measure a radio spectrum usage pattern in the vicinity of the UE. The UE may measure the radio spectrum usage pattern and then send such information to the MSS provider. Crowd sourcing of the radio spectrum usage patterns may be accomplished by aggregating data from various UEs in a geographical area. In some embodiments, the UEs may not be individually triggered by the MSS provider, but may periodically collect information regarding radio spectrum usage patterns and provide to the MSS provider for aggregation.

A communication session may be initiated by the MSS satellite with a session initiation directed to the UE. A session to the UE may be directed using control channels on the licensed radio spectrum. Depending on location and availability of unlicensed spectrum, the space network may direct the UE to utilize the licensed spectrum or unlicensed spectrum. If the licensed spectrum is not available, the space segment may transmit in a pre-designated channel for which the UE has been directed to monitor. Session initiation from the UE may be accomplished by the UE requesting the session initiation of licensed spectrum on the licensed spectrum uplink (i.e., earth to space link). If no such uplink channel is available, the UE may transmit on a pre-designated channel in a given geographical area.

In many cases, UE uplink transmissions (i.e., earth to space) may be a limiting factor for a two way communication. In these situations, a wide area repeater may transmit the UE's signals towards the space segment of the network. This may provide enhanced coverage and/or better data throughput for licensed or unlicensed spectrum bands. These repeaters will directionally transmit towards a space segment and therefore avoid interference to any terrestrial spectrum usage. Repeaters may include terrestrial devices that are standalone devices or devices such as the MSS control station/repeater or base station controller. Uplink repeaters, as part of a base station or as a standalone repeater in remote areas, may be used in unlicensed bands based on the spectrum usage map, and may significantly improve the coverage and throughput from a UE on the uplink (earth to space).

The UE may download the spectrum map using a terrestrial network such as the internet, Mobile Network Operator (MNO) networks, unlicensed networks, or Fixed Satellite Service (FSS) networks. This flexibility may be especially useful when the UE is leaving the coverage of the FSS network because such FSS networks are likely to be outside the major population centers where other wireless coverage is not readily available.

Additionally, there are vast areas where unlicensed spectrum is not used. Within unlicensed bands, there may be worldwide standards which may be used to download the spectrum usage map enabled by the MSS networks. MSS networks may inter-operate, especially if these networks do not have ubiquitous coverage, by sharing the spectrum usage maps, according to concepts described herein.

A UE that wants to connect with a MSS network may create a preferred list of spectrum for its use depending on which frequency bands are available, frequency bands the UE is capable of using, relationship of the UE with the MSS network provider, such as a regular service subscriber, a pay as you go subscriber, or a subscriber with roaming permissions, the geographical location of the UE, recent spectrum usage information, and/or financial terms of such usage. The UE may also consider some business and/or financial factors, such as unused capacity in purchase agreements, cost of services, etc. in preparing the preferred list in addition to using the spectrum usage map based on technical and spectrum related considerations.

The UE may establish a session with the MSS network on a designated radio spectrum band from the spectrum usage map. Once the session is established, the MSS network may direct the UE to switch to a another radio spectrum band if more suitable. In some embodiments, the UE may make the switching decision based on the spectrum usage map received from the MSS network.

The MSS network may establish a session on a licensed frequency band or another frequency band from the spectrum usage map which was predesignated or preassigned by the MSS network to the UE in the spectrum usage map. This establishing of the session may occur as the UE is moving out of the coverage area of another network (MNO, FSS, internet, etc.) into the spot beam of the MSS satellite, and thus a recently available spectrum usage map may be used to establish the session.

FIG. 1A is a diagram illustrating geographical areas with User Equipment (UEs) located therein, that are served by a Mobile Satellite Service (MSS) satellite, according to some embodiments of the present inventive concepts. Referring now to FIG. 1A, a MSS satellite 110 may be communicating with an MSS-capable UE 150 in a geographical area 170, also referred to as a spot beam. Some geographical areas, such as geographical area 190, may include a terrestrial base station 130. UE 135 in geographical area 190 may communicate with the base station 130 or directly communicate with MSS satellite 110. An MSS Control Station 160 may be terrestrially based and may serve as a repeater for the MSS satellite 110. The MSS Control Station 160 may serve to conserve power for signals from the MSS satellite 110. The MSS Control Station 160 may assist in the frequency assignment, monitor terrestrial conditions around the UE 150, monitor unlicensed spectrum in the geographical area 170, etc., according to various embodiments described herein. Similarly, a BWA base station controller 195 may be terrestrially based and may serve as a repeater for the MSS satellite 110 and/or for the terrestrial base station 130. The MSS Control Station 160 and/or the BWA base station controller 195 may assist in the frequency assignment, monitor terrestrial conditions around the UE 150 or UE 135, monitor unlicensed spectrum in the geographical areas 170, 190 etc., according to various embodiments described herein. The MSS Control Station 160 is distinguished from the ground station 220 of FIG. 1B. The MSS Control Station 160 may be a standalone entity or may operate in conjunction with BWA base station 195. According to some embodiments, as shown in FIG. 1A, a UE 150 that is not controlled by the BWA base station 195 or by the MSS Control station 160 may be in direct communication with the MSS satellite 110. In other words, communication between an MSS satellite 110 and UEs 150 may be via a ground station 220, via a BWA base station 130, via a repeater such as MSS Control Station 160, or communication may be directly between the MSS satellite 110 and UE 150.

Figure 1B:
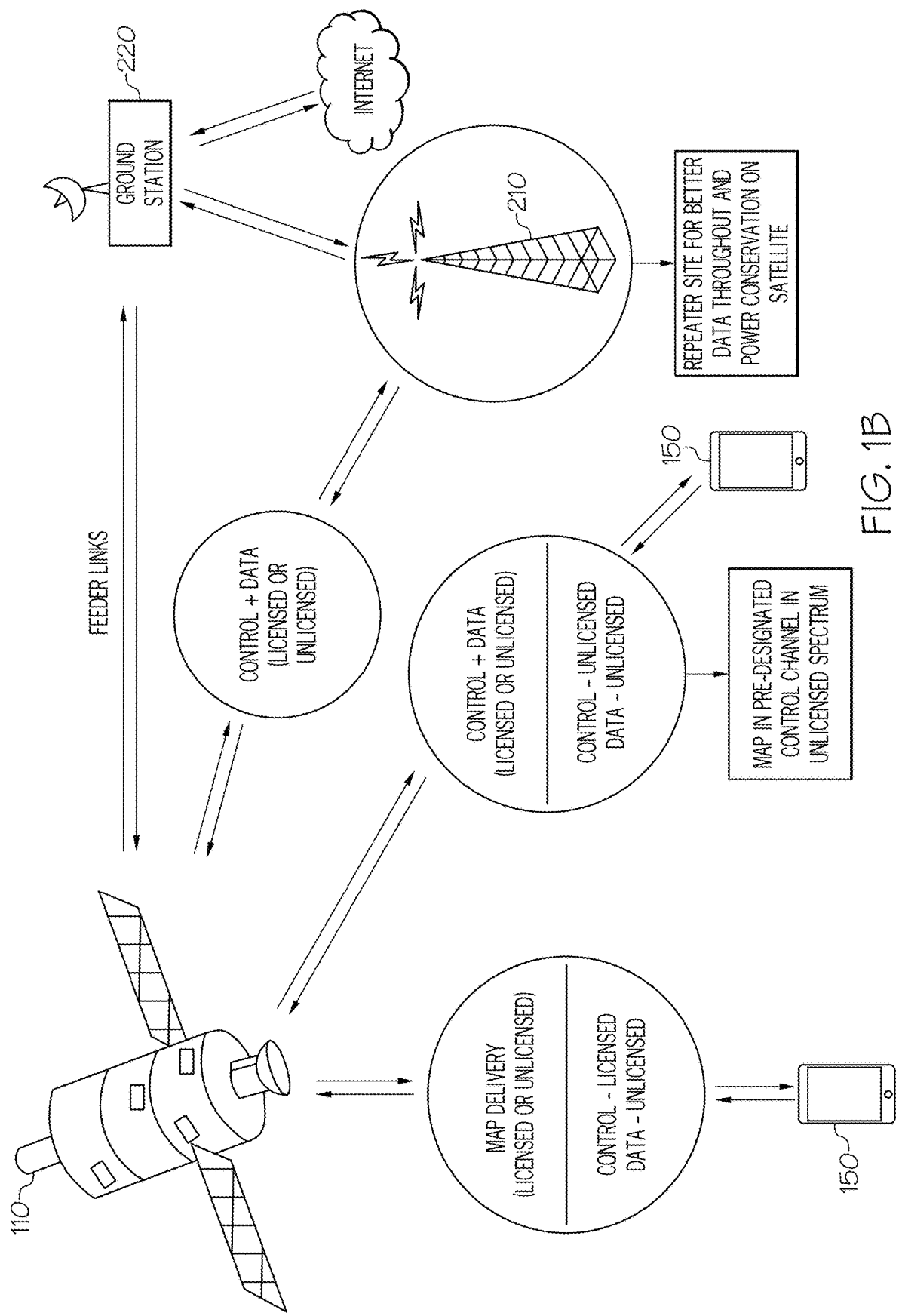
FIG. 1B is a diagram illustrating a MSS satellite system that uses unlicensed frequency spectrum, according to some embodiments of the present inventive concepts.

FIG. 1B is a diagram illustrating a MSS satellite system that uses unlicensed frequency spectrum, according to some embodiments of the present inventive concepts. A MSS satellite 110 may communicate with a ground station 220 via a feeder link. Ground station 220 may correspond to MSS Control Station 160 and/or the BWA base station controller 195 of FIG. 1A. MSS satellite 110 may communicate control and/or data signals to terrestrial base station 210 using licensed or unlicensed spectrum. MSS satellite 110 may communicate with UE 150 directly. Control and/or data signals may be communicated to UE 150 using unlicensed spectrum. A spectrum usage map may be transmitted to UE 150 from MSS satellite 110, according to some embodiments. Map delivery may be on the licensed on unlicensed spectrum. In some embodiments, control signals may be transmitted in the licensed spectrum and data signals may be transmitted on the unlicensed spectrum. Ground station 220 may be connected to the internet or other networks by wired or wireless connections.

Figure 2:
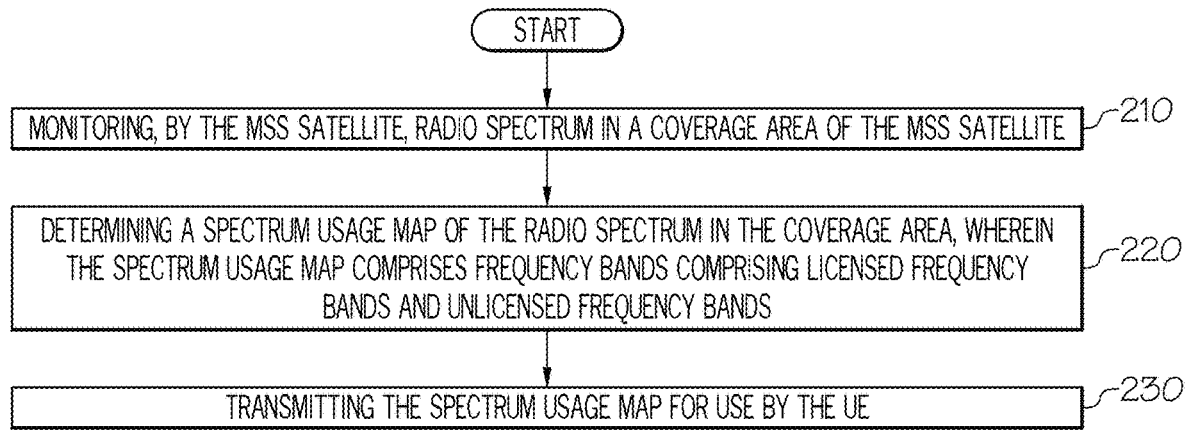

FIGS. 2 to 15 are flowcharts illustrating operations for allocating spectrum a MSS satellite to a UE, according to some embodiments of the present inventive concepts. Referring to FIG. 2, The method includes monitoring, by the MSS satellite, radio spectrum in a coverage area of the MSS satellite, at block 210. A spectrum usage map of the radio spectrum is determined in the coverage area, at block 220. The spectrum usage map includes frequency bands that include licensed frequency bands and unlicensed frequency bands. The method includes transmitting the spectrum usage map for use by the UE, at block 230. The spectrum usage map may be determined at the MSS satellite 110, or at a central terrestrial location such as the ground station 220 of FIG. 1B.

Figure 3:
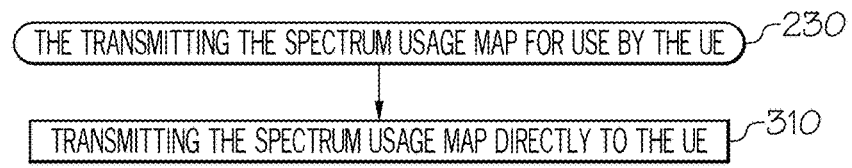
Figure 4:
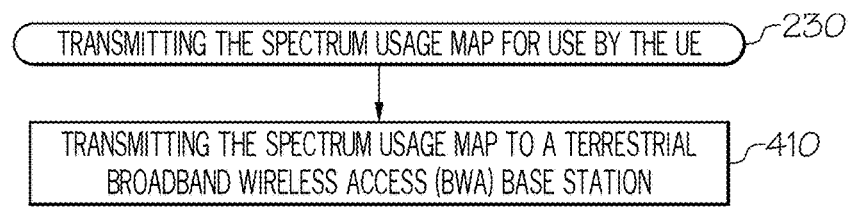
Figure 5:
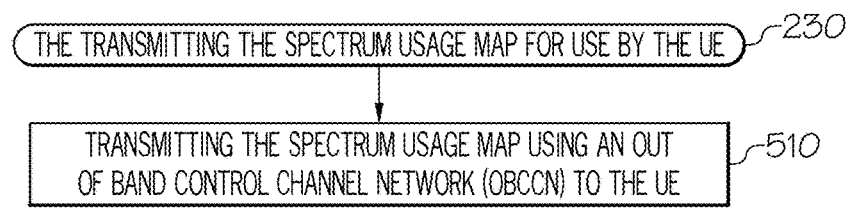

Referring to FIG. 3, according to some embodiments, transmitting the spectrum usage map for use by the UE, at block 230, may include transmitting the spectrum usage map directly to the UE, at block 310. Referring to FIG. 4, according to some embodiments, transmitting the spectrum usage map for use by the UE, at block 230, may include transmitting the spectrum usage map to a terrestrial Broadband Wireless Access (BWA) base station, 410. Referring to FIG. 5, according to some embodiments, transmitting the spectrum usage map for use by the UE, at block 230, may include transmitting the spectrum usage map using an Out of Band Control Channel Network (OBCCN) to the UE, at block 510. The spectrum usage map may include preferred licensed frequency bands that are licensed to a MSS provider that operates the MSS satellite. The preferred licensed frequency bands may be based on an availability of the frequency bands, capability of the UE to use the frequency bands, relationship of the frequency bands with the MSS provider, and/or a geographical location of the UE. The spectrum usage map may further include third-party licensed frequency bands that are available for use by the MSS provider. The coverage area of the MSS satellite may include one or more satellite spot beams associated with respective terrestrial coverage areas in which the UE is configured to communicate with the MSS satellite. The OBCCN is a dedicated control channel on which to establish communication with an MSS provider and/or on which the spectrum usage map may be downloaded by the UE. This allows the channel on which the spectrum usage map is downloaded to be separated from data traffic.

The OBCCN may be a pre-designated spectrum on which a UE may establish a communication channel with the MSS provider, a channel for downloading the spectrum usage map, and/or may be used as a traffic channel for data communication depending on data requirements and availability. The OBCCN may use dedicated spectrum or share spectrum with traffic channels.

Figure 6:
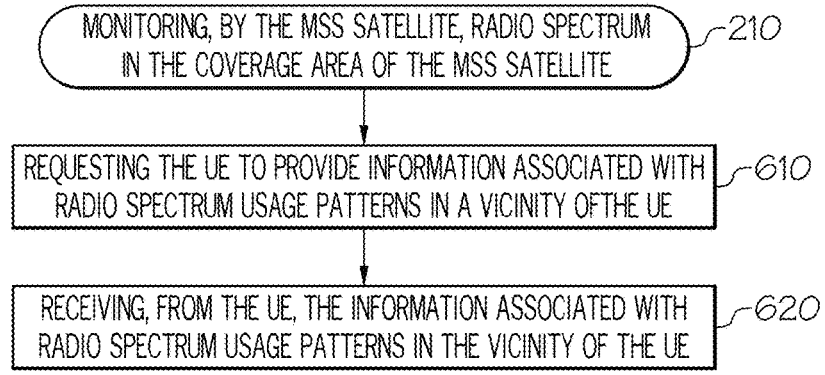

Referring to FIG. 6, monitoring, by the MSS satellite, the radio spectrum in the coverage area of the MSS satellite, at block 210, may include requesting the UE to provide information associated with radio spectrum usage patterns in a vicinity of the UE, at block 610, and receiving, from the UE, the information associated with radio spectrum usage patterns in the vicinity of the UE, at block 620.

Figure 7:
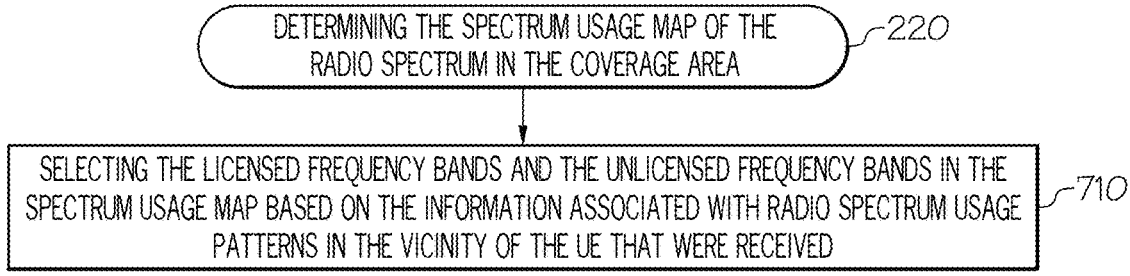

Referring to FIG. 7, determining the spectrum usage map of the radio spectrum in the coverage area, at block 220 may include selecting the licensed frequency bands and the unlicensed frequency bands in the spectrum usage map based on the information associated with radio spectrum usage patterns in the vicinity of the UE that were received, at block 710.

Figure 8:
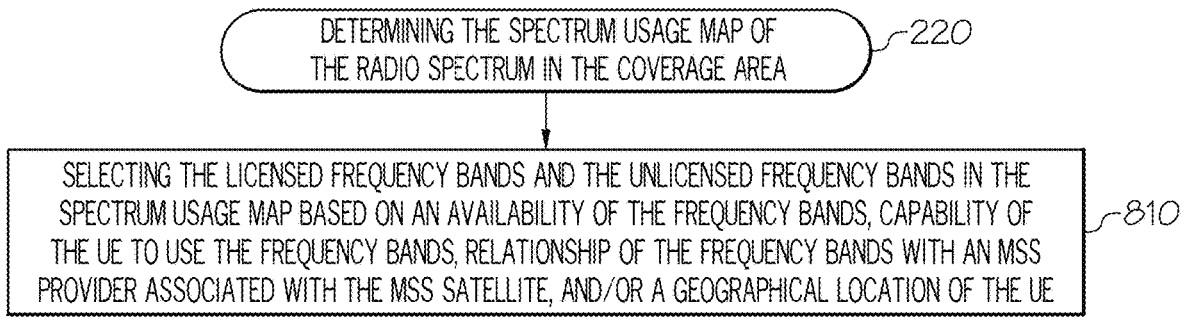

Referring to FIG. 8, determining the spectrum usage map of the radio spectrum in the coverage area, at block 220 may include selecting the licensed frequency bands and the unlicensed frequency bands in the spectrum usage map based on an availability of the frequency bands, capability of the UE to use the frequency bands, relationship of the frequency bands with an MSS provider associated with the MSS satellite, and/or a geographical location of the UE, at block 810.

Figure 9:
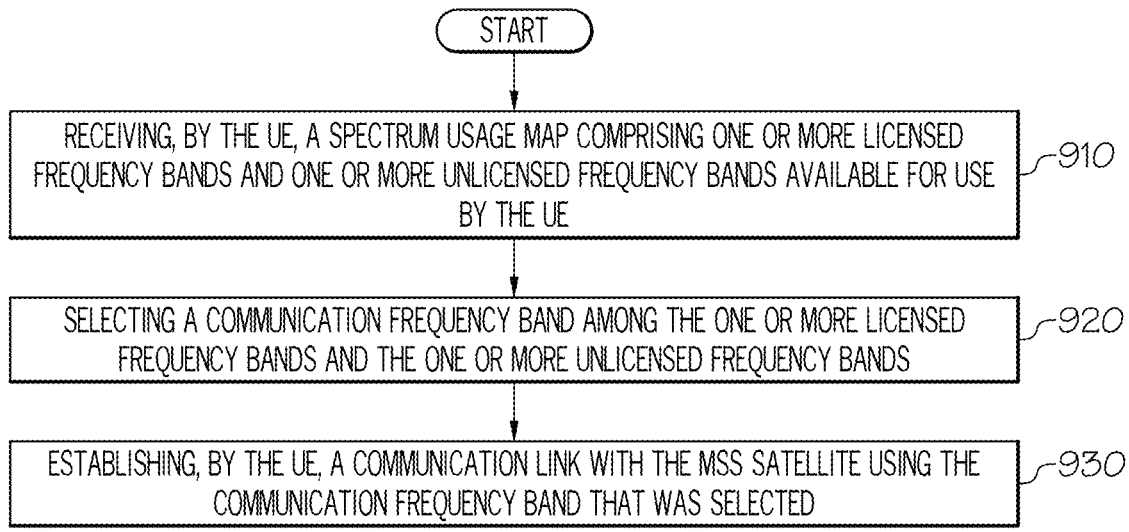

Referring to FIG. 9, a method of communication by a User Equipment (UE) in a communication network served by a Mobile Satellite Service (MSS) satellite may include receiving, by the UE, a spectrum usage map including one or more licensed frequency bands and one or more unlicensed frequency bands available for use by the UE, at block 910. The method may include selecting a communication frequency band among the one or more licensed frequency bands and the one or more unlicensed frequency bands, at block 920. The method may include establishing, by the UE, a communication link with the MSS satellite using the communication frequency band that was selected, at block 930.

Figure 10:
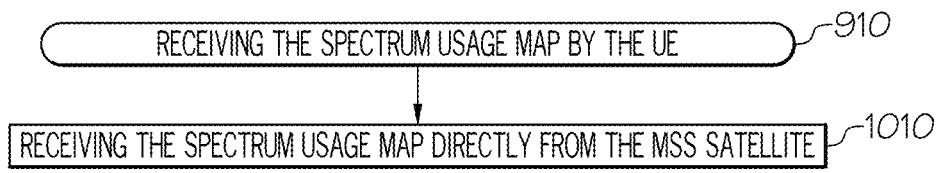
Figure 11:
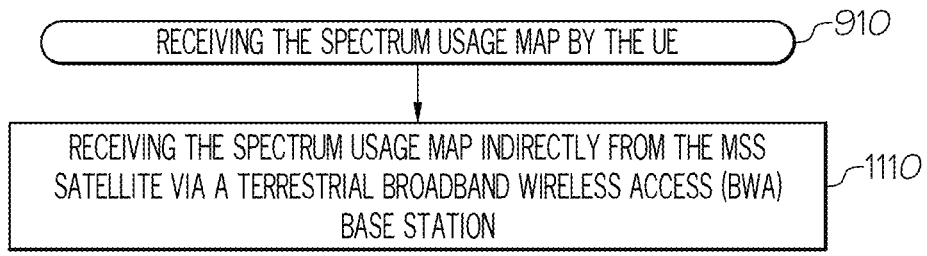

Referring to FIG. 10, receiving the spectrum usage map by the UE, 910, may include receiving the spectrum usage map directly from the MSS satellite, at block 1010. For example, UE 150 of FIG. 1A may directly receive the spectrum usage map from the MSS satellite 110. Referring to FIG. 11, receiving the spectrum usage map by the UE, at block 910 may include receiving the spectrum usage map indirectly from the MSS satellite via a terrestrial Broadband Wireless Access (BWA) base station, at block 1110. For example, UE 150 of FIG. 1A may receive the spectrum usage map from the MSS satellite 110, via base station 130. The UE may create a preferred list of frequency bands based on the spectrum usage map that was received. The preferred list of frequency bands may include an ordered list including the one or more licensed frequency bands and the one or more unlicensed frequency bands. The ordered list may indicate a preferred order for the UE to select the frequency band used for the establishing the communication link. The UE may be configured to download the spectrum usage map using a terrestrial network including an internet connection, a Mobile Network Operator (MNO) connection, a Fixed Satellite Service (FSS), or an unlicensed network.

Referring to FIG. 12, the method may include establishing, by the UE, a session with the MSS satellite on a designated frequency band based on the spectrum usage map, at block 1210. Referring to FIG. 13, the method may include receiving, by the UE from the MSS satellite, an order for the UE switching to a different frequency band, at block 1310. The UE switching may include switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands.

According to some embodiments, the spectrum usage map may be a first spectrum usage map from a first MSS provider. The one or more licensed frequency bands may include one or more first licensed frequency bands, and the one or more unlicensed frequency bands may include one or more first unlicensed frequency bands. Referring the FIG. 14, the method may include receiving, by the UE, a second spectrum usage map from a second MSS provider, the second spectrum usage map including one or more second licensed frequency bands and one or more second unlicensed frequency bands available for use by the UE, at block 1410. The method may include selecting, by the UE, a suitable spectrum usage map including either the first spectrum usage map from the first MSS provider or the second spectrum usage map from the second MSS provider, based on characteristics of the first spectrum usage map and the second spectrum usage map, at block 1420.

Referring to FIG. 15, establishing the communication link, at block 930 may include establishing, by the UE, the communication link with either a first MSS satellite of the first MSS provider or a second MSS satellite of the second MSS provider, based on the suitable spectrum usage map, at block 1510.

Figure 16:
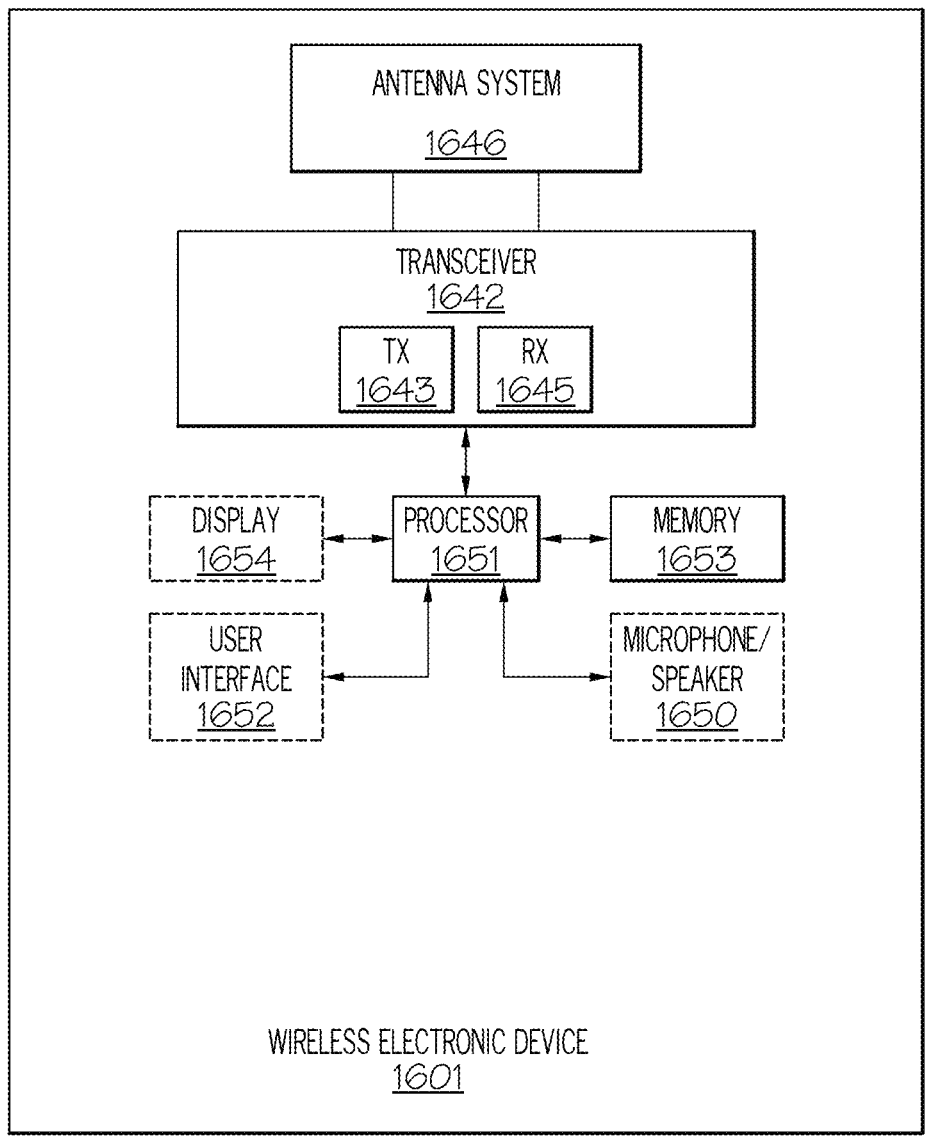
FIGS. 16 to 18 are block diagrams of various wireless electronic devices, according to some embodiments of the present inventive concepts.
Figure 17:
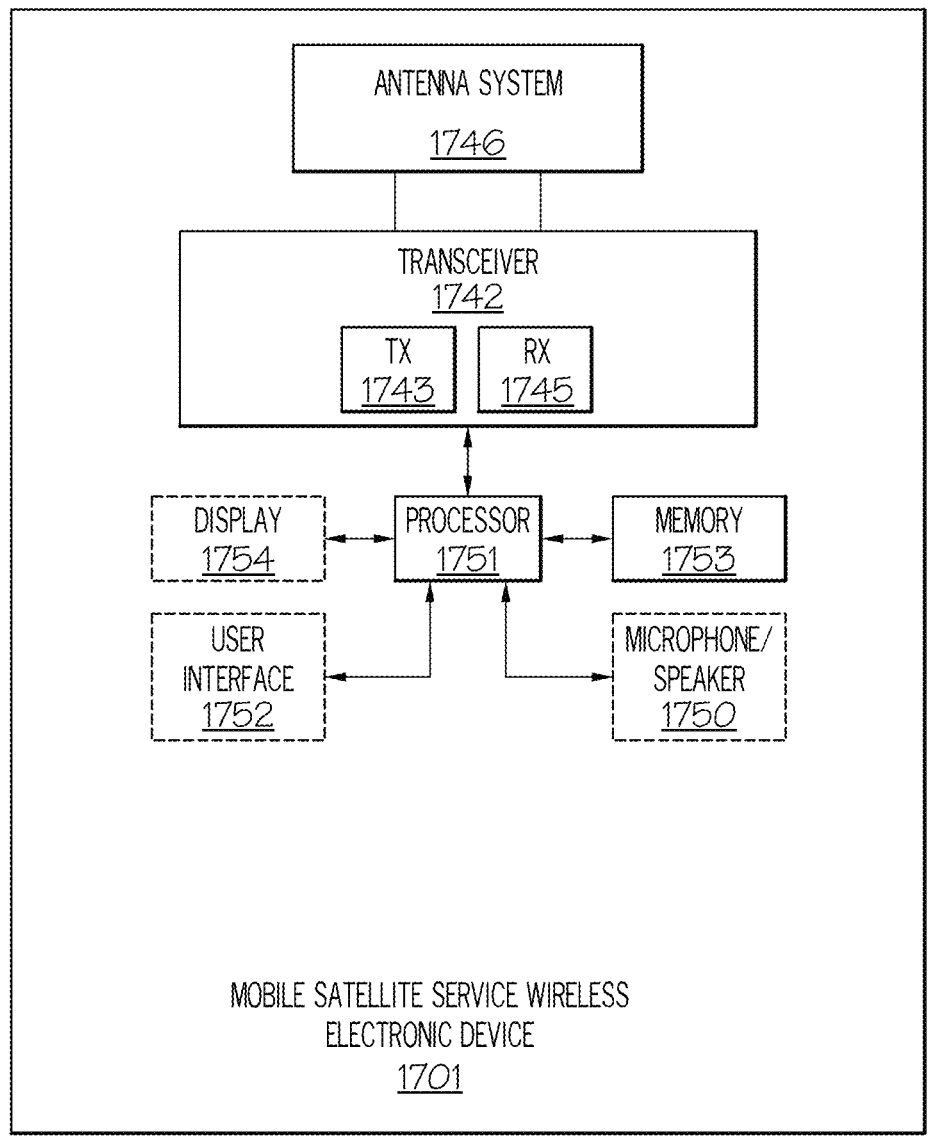
Figure 18:
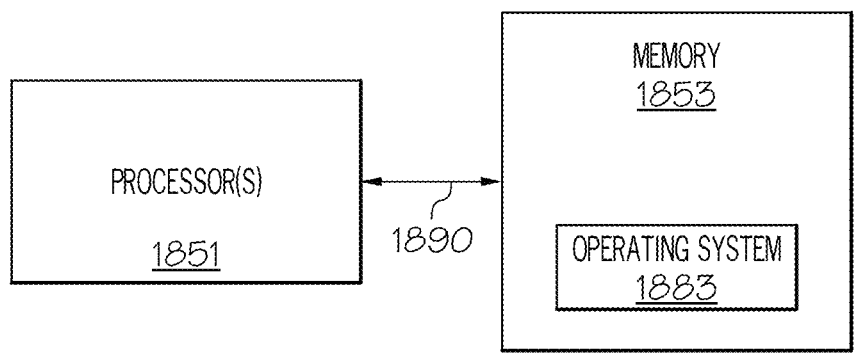

FIGS. 16, 17, and 18 are block diagrams of various electronic devices that may be used in a MSS system and/or a UE. Referring to FIG. 16, a block diagram is provided of a wireless electronic device which may correspond to one more of various elements of a UE 150, an MSS control station 160, and/or a base station controller 195 of FIG. 1A, according to some embodiments. Referring to FIG. 17, a block diagram is provided of a Mobile Satellite Service wireless electronic device, which may correspond to one or more of various MSS network elements such as MSS satellite 110 or a MSS control station 160 of FIG. 1A and/or FIG. 1B, according to some embodiments.

As illustrated in FIG. 16, a wireless electronic device 1601 may include an antenna system 1646, a transceiver 1642, a processor (e.g., processor circuit) 1651, and a memory 1653. Moreover, the wireless electronic device 1601 may optionally include a display 1654, a user interface 1652, and/or a microphone/speaker 1650. The MSS wireless electronic device 1701 of FIG. 17 may have components that operate similarly to those of wireless electronic device 1601 of FIG. 16 and thus details will not be repeated.

The transmitter portions of transceivers 1642 or 1742 of FIGS. 16 and 17 may operate similarly to one another so each will not be described separately. Referring once again to FIG. 16, a transmitter portion 1643 of the transceiver 1642 may convert information, which is to be transmitted by the wireless electronic device 1601, into electromagnetic signals suitable for radio communications. A receiver portion 1645 of the transceiver 1642 may demodulate electromagnetic signals, which are received by the wireless electronic device 1601. The transceiver 1642 may include transmit/receive circuitry (TX/RX) that provides separate communication paths for supplying/receiving RF signals to different radiating elements of the antenna system 1646 via their respective RF feeds. Accordingly, when the antenna system 1646 includes two active antenna elements, the transceiver 1642 may include transmit circuit 1643 and/or receive circuit 1645 connected to different ones of the antenna elements via the respective RF feeds. For example, the transmit/receive circuits 1643/1645 may be connected to a Wi-Fi antenna, satellite antenna, MIMO antennas, a close/short-range (e.g., a Near-Field Communication (NFC), or BLUETOOTH®) antenna, cellular antenna, satellite antenna, or a 3G, 4G, LTE, or 5G antenna. Moreover, the antenna system 1646 and/or the transceiver 1642 may include a GPS receiver.

Referring still to FIG. 16, the memory 1653 may store computer program instructions that, when executed by the processor circuit 1651, carry out operations of the wireless electronic device 1601. In some embodiments, the memory 1653 can be a non-transitory computer readable storage medium including computer readable program code therein that when executed by the processor 1651 causes the processor 1651 to perform a method described herein. As an example, the memory 1653 may store an application which can perform the operations illustrated in various blocks of the flow charts of FIGS. 2 to 15. The memory 1653 can be, for example, a non-volatile memory, such as a flash memory, that retains the stored data while power is removed from the memory 1653. The memory 1753 or FIG. 17 and memory 1853 of FIG. 18 operate similarly to that of the memory 1653 of FIG. 16 and thus will not be discussed separately.

Referring once again to FIG. 16, wireless electronic device 1601 may be associated with a UE 150 or UE 135 in a communication network served by MSS satellite 110. The wireless electronic device 1601 includes transceiver 1642 and a processor 1651 coupled to memory 1653, which is configured to store instructions that cause the processor 1651 to perform operations including receiving, a spectrum usage map including one or more licensed frequency bands and one or more unlicensed frequency bands available for use by the UE 150, 135, selecting a communication frequency band among the one or more licensed frequency bands and the one or more unlicensed frequency bands, and establishing, using the transceiver 1642, a communication link with the MSS satellite 110 on the communication frequency band that was selected.

Referring once again to FIG. 17, MSS wireless electronic device 1701 may be associated with a MSS satellite 110 of FIG. 1A and FIG. 1B. Wireless electronic device 1700 may be configured to allocate spectrum to UE 150 or UE 135 of FIG. 1A and FIG. 1B. The processor 1751 is coupled to memory 1753, which is configured to store instructions that cause the processor 1751 to perform operations including monitoring, by the MSS satellite 110, radio spectrum in a coverage area of the MSS satellite 110, and determining a spectrum usage map of the radio spectrum in the coverage area, wherein the spectrum usage map includes frequency bands including licensed frequency bands and unlicensed frequency bands.

FIG. 18 illustrates a block diagram of an example processor 1851 and memory 1853 that may be used in accordance with various embodiments of the present inventive concepts. The processor 1851 communicates with the memory 1853 via an address/data bus 1890. The processor 1851 may be, for example, a commercially available or custom microprocessor. Moreover, the processor 1851 may include multiple processors. The memory 1853 is representative of the overall hierarchy of memory devices containing the software and data used to implement various functions as described herein. The memory 1853 may include, but is not limited to, the following types of devices: cache, ROM, PROM, EPROM, EEPROM, flash, Static RAM (SRAM), and Dynamic RAM (DRAM).

Still referring to FIG. 18, the memory 1853 may hold various categories of software and data, such as an operating system 1883. The processor 1851 and memory 1853 may correspond to any of the processors 1651 or 1751 and memories 1653 and 1753 of wireless electronic device 1601, or MSS wireless electronic device 1701 of FIG. 16 and/or FIG. 17. Accordingly, the operating system 1883 may control operations of the devices 1601 and/or 1701. In particular, the operating system 1883 may manage the resources of corresponding devices 1601 and/or 1701 and may coordinate execution of various programs performing operations described herein by the processor 1851.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall That which is claimed is:

1. A method of allocating spectrum by a Mobile Satellite Service (MSS) satellite to a User Equipment (UE), the method comprising:
monitoring, by the MSS satellite, radio spectrum in a coverage area of the MSS satellite;
determining a spectrum usage map of the radio spectrum in the coverage area, wherein the spectrum usage map comprises frequency bands comprising licensed frequency bands and unlicensed frequency bands; and
transmitting the spectrum usage map for use by the UE.

2. The method of claim 1, wherein the transmitting the spectrum usage map for use by the UE comprises:
transmitting the spectrum usage map directly to the UE.

3. The method of claim 1, wherein the transmitting the spectrum usage map for use by the UE comprises:
transmitting the spectrum usage map to a terrestrial Broadband Wireless Access (BWA) base station.

4. The method of claim 3, wherein the terrestrial BWA base station transmits, to the UE, ones of the licensed frequency bands and ones of the unlicensed frequency bands available for use by the UE.

5. The method of claim 1, wherein the transmitting the spectrum usage map for use by the UE comprises:
transmitting the spectrum usage map using an Out of Band Control Channel Network (OBCCN) to the UE.

6. The method of claim 1, wherein the spectrum usage map comprises preferred licensed frequency bands that are licensed to a MSS provider that operates the MSS satellite.

7. The method of claim 6, wherein the preferred licensed frequency bands is based on an availability of the frequency bands, capability of the UE to use the frequency bands, relationship of the frequency bands with the MSS provider, and/or a geographical location of the UE.

8. The method of claim 6, wherein the spectrum usage map further comprises third-party licensed frequency bands that are available for use by the MSS provider.

9. The method of claim 1, wherein the coverage area of the MSS satellite comprises one or more satellite spot beams associated with respective terrestrial coverage areas in which the UE is configured to communicate with the MSS satellite.

10. The method of claim 1, wherein the monitoring, by the MSS satellite, the radio spectrum in the coverage area of the MSS satellite comprises:
requesting the UE to provide information associated with radio spectrum usage patterns in a vicinity of the UE; and
receiving, from the UE, the information associated with radio spectrum usage patterns in the vicinity of the UE.

11. The method of claim 10, wherein the determining the spectrum usage map of the radio spectrum in the coverage area comprises:
selecting the licensed frequency bands and the unlicensed frequency bands in the spectrum usage map based on the information associated with radio spectrum usage patterns in the vicinity of the UE that were received.

12. The method of claim 11, wherein the determining the spectrum usage map of the radio spectrum in the coverage area further comprises:
selecting the licensed frequency bands and the unlicensed frequency bands in the spectrum usage map based on an availability of the frequency bands, capability of the UE to use the frequency bands, relationship of the frequency bands with an MSS provider associated with the MSS satellite, and/or a geographical location of the UE.

13. A method of communication by a User Equipment (UE) in a communication network served by a Mobile Satellite Service (MSS) satellite, the method comprising:
receiving, by the UE, a spectrum usage map comprising one or more licensed frequency bands and one or more unlicensed frequency bands available for use by the UE;
selecting a communication frequency band among the one or more licensed frequency bands and the one or more unlicensed frequency bands; and
establishing, by the UE, a communication link with the MSS satellite using the communication frequency band that was selected.

14. The method of claim 13, wherein the receiving the spectrum usage map by the UE comprises:
receiving the spectrum usage map directly from the MSS satellite.

15. The method of claim 13, wherein the receiving the spectrum usage map by the UE comprises:
receiving the spectrum usage map indirectly from the MSS satellite via a terrestrial Broadband Wireless Access (BWA) base station.

16. The method of claim 13, wherein the UE creates a preferred list of frequency bands based on the spectrum usage map that was received.

17. The method of claim 16, wherein the preferred list of frequency bands comprises an ordered list comprising the one or more licensed frequency bands and the one or more unlicensed frequency bands, and
wherein the ordered list indicates a preferred order for the UE to select the frequency band used for the establishing the communication link.

18. The method of claim 13, wherein the UE is configured to download the spectrum usage map using a terrestrial network comprising an internet connection, a Mobile Network Operator (MNO) connection, a Fixed Satellite Service (FSS), or an unlicensed network.

19. The method of claim 13, further comprising:
establishing, by the UE, a session with the MSS satellite on a designated frequency band based on the spectrum usage map.

20. The method of claim 19, further comprising:
receiving, by the UE from the MSS satellite, an order for the UE switching to a different frequency band,
wherein the UE switching comprises switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands.

21. The method of claim 13, wherein the spectrum usage map comprises a first spectrum usage map from a first MSS provider, wherein the one or more licensed frequency bands comprises one or more first licensed frequency bands, and the one or more unlicensed frequency bands comprises one or more first unlicensed frequency bands, the method further comprising:

receiving, by the UE, a second spectrum usage map from a second MSS provider, the second spectrum usage map comprising one or more second licensed frequency bands and one or more second unlicensed frequency bands available for use by the UE; and selecting, by the UE, a suitable spectrum usage map comprising either the first spectrum usage map from the first MSS provider or the second spectrum usage map from the second MSS provider, based on characteristics of the first spectrum usage map and the second spectrum usage map.

22. The method of claim 21, wherein the establishing the communication link comprises:

establishing, by the UE, the communication link with either a first MSS satellite of the first MSS provider or a second MSS satellite of the second MSS provider, based on the suitable spectrum usage map.

23. A wireless electronic device associated with a Mobile Satellite Service (MSS) satellite, the wireless electronic device configured to allocate spectrum to a User Equipment (UE), the wireless electronic device comprising:

a transceiver; and a processor coupled to a memory, wherein the memory is configured to store instructions that cause the processor to perform operations comprising:

monitoring, by the MSS satellite, radio spectrum in a coverage area of the MSS satellite; and determining a spectrum usage map of the radio spectrum in the coverage area, wherein the spectrum usage map comprises frequency bands comprising licensed frequency bands and unlicensed frequency bands, wherein the transceiver is configured to transmit the spectrum usage map to the UE.

24. The wireless electronic device of claim 23, wherein the coverage area of the MSS satellite comprises one or more satellite spot beams associated with respective terrestrial coverage areas in which the UE is configured to communicate with the MSS satellite.

25. The wireless electronic device of claim 23, wherein the monitoring, by the MSS satellite, the radio spectrum in the coverage area of the MSS satellite comprises:

requesting the UE to provide information associated with radio spectrum usage patterns in a vicinity of the UE; and receiving, from the UE, the information associated with radio spectrum usage patterns in the vicinity of the UE.

26. The wireless electronic device of claim 25, wherein the determining the spectrum usage map of the radio spectrum in the coverage area comprises:

selecting the licensed frequency bands and the unlicensed frequency bands in the spectrum usage map based on the information associated with radio spectrum usage patterns in the vicinity of the UE that were received.

27. The wireless electronic device of claim 26, wherein the determining the spectrum usage map of the radio spectrum in the coverage area further comprises:

selecting the licensed frequency bands and the unlicensed frequency bands in the spectrum usage map based on an availability of the frequency bands, capability of the UE to use the frequency bands, relationship of the frequency bands with an MSS provider associated with the MSS satellite, and/or a geographical location of the UE.

28. A wireless electronic device associated with a User Equipment (UE) in a communication network served by a Mobile Satellite Service (MSS) satellite, the wireless electronic device comprising:

a transceiver; and a processor coupled to a memory, wherein the memory is configured to store instructions that cause the processor to perform operations comprising:

receiving, a spectrum usage map comprising one or more licensed frequency bands and one or more unlicensed frequency bands available for use by the UE;

selecting a communication frequency band among the one or more licensed frequency bands and the one or more unlicensed frequency bands; and establishing, using the transceiver, a communication link with the MSS satellite on the communication frequency band that was selected.

29. The wireless electronic device of claim 28, wherein the UE creates a preferred list of frequency bands based on the spectrum usage map that was received.

30. The wireless electronic device of claim 29, wherein the preferred list of frequency bands comprises an ordered list comprising the one or more licensed frequency bands and the one or more unlicensed frequency bands, and wherein the ordered list indicates a preferred order for the UE to select the frequency band used for the establishing the communication link.

31. The wireless electronic device of claim 28, wherein the processor is configured to perform operations further comprising:

receiving, from the MSS satellite, an order for the UE switching to a different frequency band, wherein the UE switching comprises switching from a licensed frequency band of the one or more licensed frequency bands to an unlicensed frequency band of the one or more unlicensed frequency bands, or switching from the unlicensed frequency band of the one or more unlicensed frequency bands to the licensed frequency band of the one or more licensed frequency bands.

* * * * *